United States Patent
Ramakrishnan et al.

(10) Patent No.: US 8,492,015 B2
(45) Date of Patent: Jul. 23, 2013

(54) BATTERY FUSE TERMINAL COVER WITH LATCH

(75) Inventors: Avinaash Ramakrishnan, Brighton, MI (US); Tuan La, Canton, MI (US); Bert Weinert, Troy, MI (US)

(73) Assignee: Nissan North America, Inc., Franklin, TN (US)

( * ) Notice: Subject to any disclaimer, the term of this patent is extended or adjusted under 35 U.S.C. 154(b) by 286 days.

(21) Appl. No.: 12/910,248

(22) Filed: Oct. 22, 2010

(65) Prior Publication Data
US 2012/0100418 A1    Apr. 26, 2012

(51) Int. Cl.
*H01M 2/34*     (2006.01)
*H01R 13/52*    (2006.01)

(52) U.S. Cl.
USPC ........... 429/65; 439/522; 439/904; 174/138 F

(58) Field of Classification Search
USPC .. 439/521, 522, 901, 904; 429/65; 174/138 F
See application file for complete search history.

(56) References Cited

U.S. PATENT DOCUMENTS

| | | |
|---|---|---|
| 4,698,459 A | 10/1987 | Drake |
| 5,169,338 A | 12/1992 | Dewar et al. |
| 5,338,898 A | 8/1994 | Luciano et al. |
| 5,346,407 A | 9/1994 | Hood |
| 5,413,500 A | 5/1995 | Tanaka |
| 5,439,759 A | 8/1995 | Lippert et al. |
| 5,569,882 A * | 10/1996 | Yokoyama et al. .... 174/138 F X |
| 5,576,516 A | 11/1996 | Kameyama et al. |
| 5,645,448 A | 7/1997 | Hill |
| 5,804,770 A * | 9/1998 | Tanaka ........................ 429/65 X |
| 5,871,364 A | 2/1999 | Shinchi et al. |
| 5,902,695 A | 5/1999 | Siedlik et al. |
| 5,910,029 A | 6/1999 | Siedlik et al. |
| 5,925,854 A | 7/1999 | Sugiyama |
| 6,153,329 A | 11/2000 | Raschilla et al. |
| 6,234,429 B1 | 5/2001 | Yang |
| 6,376,771 B1 | 4/2002 | Kosuge |
| 6,413,124 B2 | 7/2002 | Murakami et al. |
| 6,576,838 B2 | 6/2003 | Matsumura |
| 6,828,058 B2 | 12/2004 | Matsumura et al. |
| 7,176,780 B2 | 2/2007 | Iwata |
| 7,201,995 B2 | 4/2007 | Matsunaga et al. |
| 7,361,841 B1 | 4/2008 | Smolen et al. |

FOREIGN PATENT DOCUMENTS

| | | |
|---|---|---|
| JP | 10220424 | 8/1998 |
| JP | 2000340214 | 12/2000 |
| JP | 2001167810 | 6/2001 |

* cited by examiner

*Primary Examiner* — Stephen J. Kalafut
(74) *Attorney, Agent, or Firm* — Young, Basile, Hanlon & MacFarlane P.C.

(57) ABSTRACT

Disclosed herein are embodiments of a battery assembly and a cover for a battery fuse terminal. One embodiment of a battery fuse terminal cover comprises a base portion having a first end and a first hinge end opposite the first end, a movable portion having a second end and a second hinge end opposite the second end and a first hinge located between the first hinge end of the base portion and the second hinge end of the movable portion. The movable portion is configured to rotate relative to the base portion via the first hinge between a concealing position and an exposing position. A cover securing member is located on the base portion and configured to secure the cover to the battery fuse terminal.

18 Claims, 5 Drawing Sheets

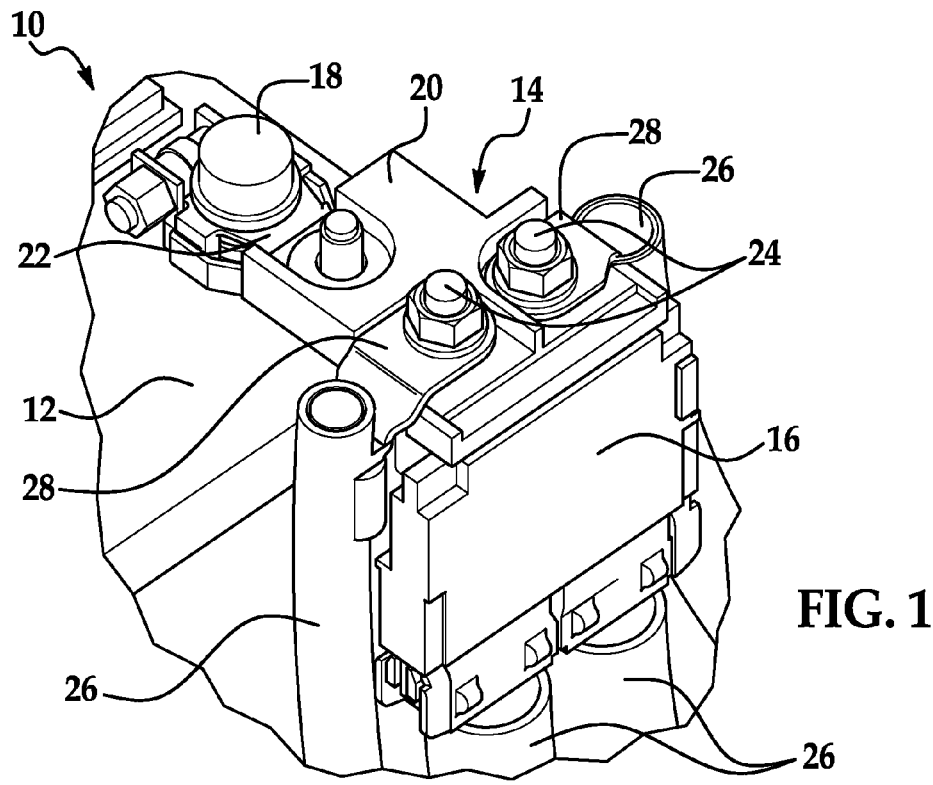
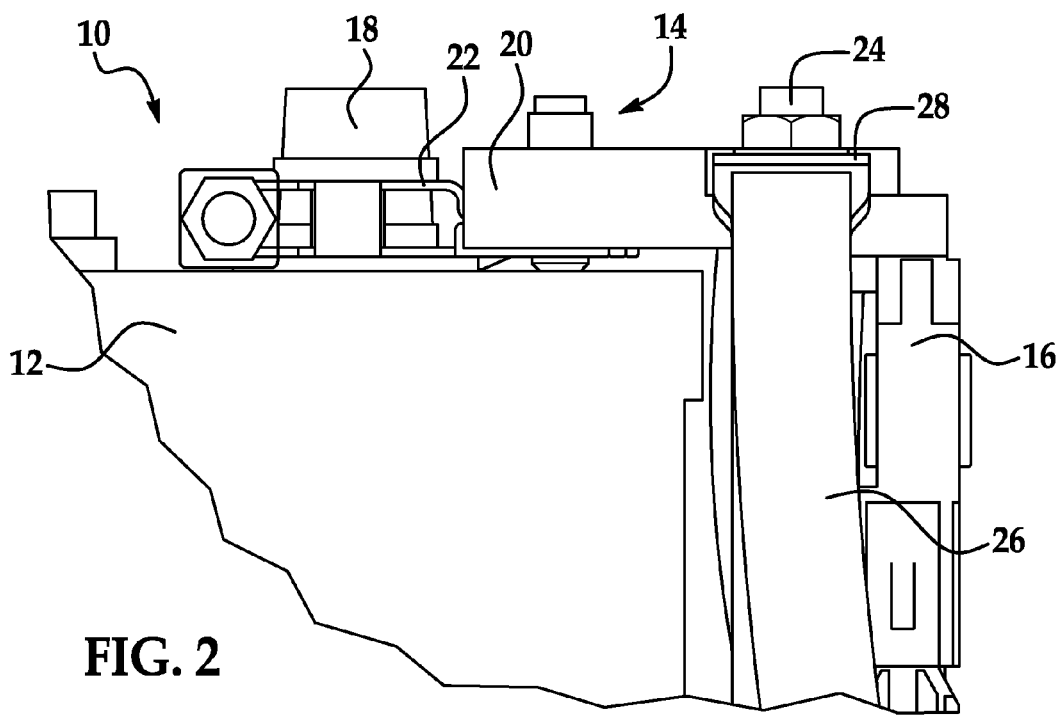

BATTERY FUSE TERMINAL COVER WITH LATCH

TECHNICAL FIELD

The present invention generally pertains to battery assemblies and in particular to battery terminal cover latches for retaining terminal covers to the battery.

BACKGROUND

Many vehicles are designed to accommodate high powered equipment which draws current from the vehicle battery. To meet such accommodations, the equipment will connect to the battery post through a terminal connector which typically includes a fuse unit to provide multiple connections. A battery fuse terminal (BFT) cover can be used to protect the terminal connector and fuse unit while installed to the battery. The BFT cover is preferred to be selectively removable, so it includes ribs to provide a friction fit with the terminal connector and fuse unit. The BFT cover can also include snap-fit connections that connect the cover to the fuse unit.

However, upon some impacts, the friction fit and snap-fit connections can be overridden by the force applied by the impact, causing the BFT cover to become removed from the terminal connector. With the BFT cover removed, the battery and surrounding vehicle components and body metal can come into contact, which can result in damage or short circuiting of the battery.

SUMMARY

Embodiments of a battery assembly and a cover for a battery fuse terminal are disclosed herein. One embodiment of a battery fuse terminal cover comprises a base portion having a first end and a first hinge end opposite the first end, a movable portion having a second end and a second hinge end opposite the second end and a first hinge located between the first hinge end of the base portion and the second hinge end of the movable portion. The movable portion is configured to rotate relative to the base portion via the first hinge between a concealing position and an exposing position. A cover securing member is located on the base portion and configured to secure the cover to the battery fuse terminal.

One embodiment of a battery assembly for a battery comprises a battery terminal having a post, a terminal connector and a post engagement structure coupling the post and the terminal connector, a fuse unit coupled to the terminal connector and a battery fuse terminal cover. The battery fuse terminal comprises a base portion covering at least a portion of the fuse unit, a movable portion covering at least a portion of the battery terminal and a first hinge connecting the base portion and movable portion. The movable portion is movable about the base portion via the hinge between a concealing position in which the terminal connector is concealed and an exposing position in which the terminal connector is exposed. A cover securing member extends from the base portion. At least part of the cover securing member is located on one side of the terminal connector and the first hinge is located on an opposing side of the terminal connector. The cover securing member is configured to retain the battery fuse terminal cover on the battery terminal and fuse unit.

These and other embodiments of the invention are described in additional detail hereinafter.

BRIEF DESCRIPTION OF THE DRAWINGS

The description herein makes reference to the accompanying drawings wherein like reference numerals refer to like parts throughout the several views, and wherein:

FIG. 1 is an elevated perspective view of the battery assembly with the battery fuse terminal cover removed;

FIG. 2 is a side perspective view of the battery assembly with the battery fuse terminal cover removed;

DETAILED DESCRIPTION

Figure 3:
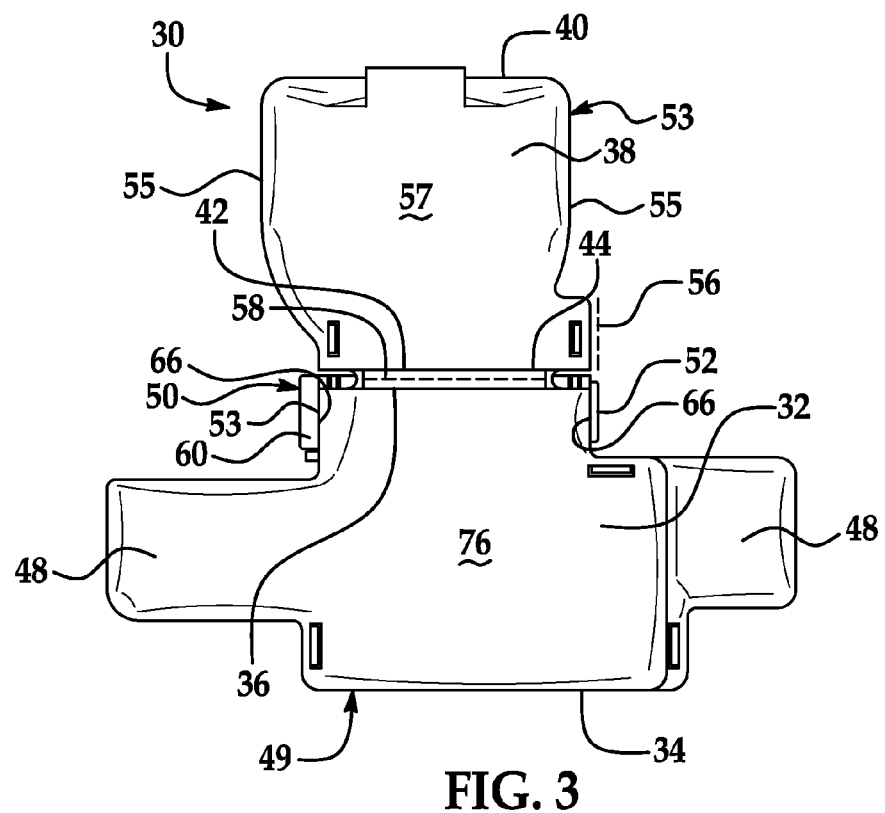
FIG. 3 is a top isolated view of the battery fuse terminal cover with the cover securing member in the latched configuration.

FIGS. 1 and 2 illustrate a battery assembly 10 with the battery fuse terminal cover removed. The battery assembly 10 comprises a battery 12, a battery terminal 14 and a fuse unit 16. The battery terminal 14 has a post 18 and a terminal connector 20. A post engagement structure 22 couples the post 18 to the terminal connector 20. The fuse unit 16 is coupled to the terminal connector 20 and includes studs 24 which are connected to wires 26 via stud connectors 28 and fuses (not shown) within fuse unit 16. FIGS. 1 and 2 represent a typical battery configuration which is provided by means of example and not meant to be limiting. Other battery configurations configured for use with a battery fuse terminal cover are contemplated and are within the scope of this disclosure.

An embodiment of a battery fuse terminal cover 30 as disclosed herein is shown in FIGS. 3-6. The battery fuse terminal cover 30 has a base portion 32 having a first end 34 and a first hinge end 36 opposite the first end 34. The battery fuse terminal cover 30 also has a movable portion 38 having a second end 40 and a second hinge end 42 opposite the second end 40. A first hinge 44 is located between the first hinge end 36 of the base portion 32 and the second hinge end 42 of the movable portion 38.

The battery fuse terminal cover 30 can also include shoulders 48 that extend from the base portion 32 to provide cover for additional OEM upfitter/after market attachment studs that may be desired or required for additional power to added circuits. As shown in the figures, a shoulder 48 extends from opposing sides of the base portion 32. However, this is provided as an example and is not meant to be limiting. The base portion 32 can be without the extended shoulders 48 or can be provided with only one shoulder 48. The width of the shoulder or shoulders 48 can also be any width desired or required by those skilled in the art. The width of each shoulder 48 can be the same, or the width of the shoulders 48 can be different as shown in FIG. 3.

Figure 4:
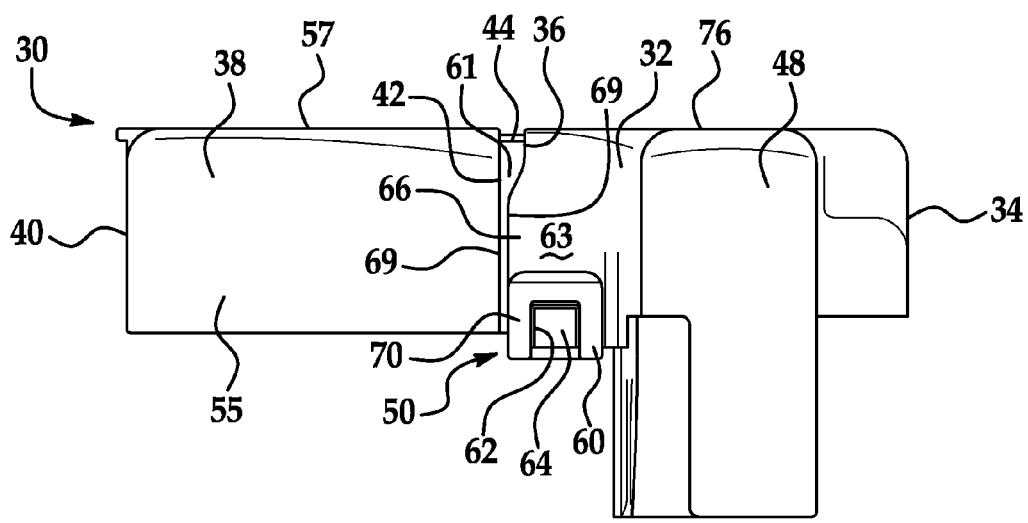
FIG. 4 is a side isolated view of the battery fuse terminal cover with the cover securing member in the latched configuration.
Figure 5:
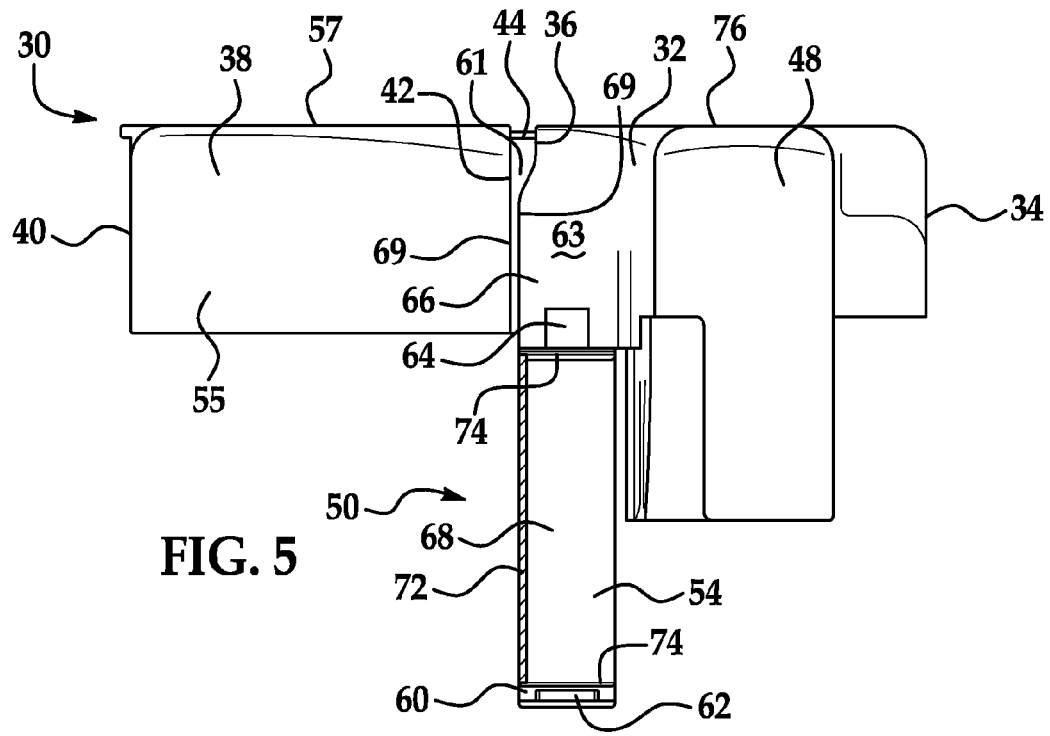
FIG. 5 is a side isolated view of the battery fuse terminal cover with the cover securing member in the released configuration.

As shown in FIG. 3, the base portion 32 has an outer surface 49 that defines opposing side walls 66, a cover surface 76, shoulders 48 and the first end 34. The outer surface 49 has a corresponding inner surface 51, shown in FIG. 6. The movable portion 38 has an outer surface 53 that defines opposing side walls 55, a cover surface 57 and the second end 40. The outer surface 53 has a corresponding inner surface 59, shown in FIG. 6. The cover surfaces 76, 57 of the base portion 32 and movable portion 38 are separated at the first hinge end 36 and the second hinge end 42 respectively by the first hinge 44. As shown in FIGS. 4 and 5, edges 69 of the side walls 66, 55 of the base portion 32 and movable portion 38 respectively are separated by a gap 61 that coincides with or is less than the width of the first hinge 44 separating the base portion 32 and movable portion 38. As shown, the gap 61 can be different widths along its length.

The battery fuse terminal cover 30 includes a cover securing member 50 located on the base portion 32. The cover securing member 50 is configured to secure the battery fuse terminal cover 30 to the battery fuse terminal 14. The cover securing member 50 can be located proximate the first hinge end 36 of the base portion 32. The cover securing member 50 can also be located adjacent the edges 69 of the side walls 66. The cover securing member 50 comprises a second hinge 52 and a body portion 54. The second hinge 52 can be located on the base portion 32. As shown in the figures, the second hinge 52 can be positioned adjacent to the first hinge end 36 of the base portion 32 with an axis 56 extending substantially perpendicular to an axis 58 of the first hinge 44, as best shown in FIG. 3.

Figure 6:
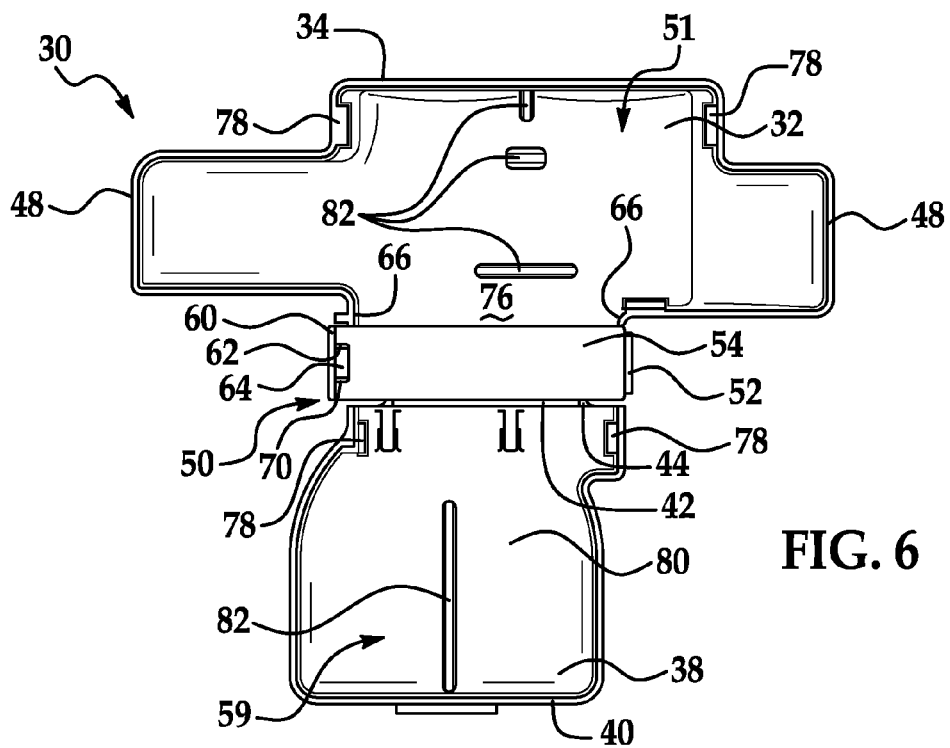
FIG. 6 is a bottom isolated view of the battery fuse terminal cover with the cover securing member in the latched configuration.

The body portion 54 is attached to the base portion 32 via the second hinge 52 and has a latch portion 60 on an end opposite the second hinge 52. The latch portion 60 can define a latch opening 62 for receiving a retention member 64. The retention member 64 can be formed on an outer surface 63 of the side wall 66 of the base portion 32 opposite the side wall 66 on which the second hinge 52 is located. The body portion 54 is rotatable around the second hinge 52 between an open configuration 68 as shown in FIG. 5 and a latched configuration 70 as shown in FIGS. 3, 4 and 6. The latch portion 60 engages the retention member 64 when the body portion 54 is in the latched configuration 70. The cover securing member 50 also has a released configuration (not shown) in which the latch portion 60 is released from the retention member 64. The latch portion 60 is configured to be moveable from the latched configuration 70 to the released configuration with a person's finger or a small tool, for example.

The body portion 54 of the cover securing member 50 can have one or more reinforcement ribs 72 to provide stiffness to the body portion 54. As shown in FIG. 5, the body portion 54 can have a single reinforcement rib 72 that extends the length of the body portion 54. However, this is provided as an example and is not meant to be limiting. The reinforcement rib or ribs 72 can extend only a portion of the length of the body portion 54, can be intermittent across the length of the body portion 54, or can be on a side of the body portion 54 not shown in the figures. The body portion 54 is shown as a continuous panel extending from the second hinge 52 to the latch portion 60. However, it is contemplated that the body portion 54 be other configurations. As a non-limiting example, the body portion 54 may only be a width that is a portion of the width of the second hinge 52. As another non-limiting example, the body portion 54 can be a plurality of ribs extending between the second hinge 52 and the latch portion 60.

The latch portion 60 and the corresponding side wall 66 of the base portion 32 can have ribs 74 that provide a friction fit between the cover securing member 50 and the base portion 32. The friction fit between the cover securing member 50 and the base portion 32 reduces potential movement such as twisting of the base portion 54 when the latch portion 60 is secured with the retention member 64. Such movement of the base portion 54 during normal and abnormal impacts could damage the connection between the body portion 54 and latch portion 60, possibly reducing the effectiveness of the cover securing member 50.

With reference to FIG. 6, the inner surfaces 51, 59 of the base portion 32 and movable portion 38 respectively define a cavity 80. The cavity 80 within the base portion 32 is at least partially defined by the cover surface 76, first end 34, shoulders 48 and side walls 66. The cavity 80 within the movable portion 38 is at least partially defined by the cover surface 57, opposing side walls 55 and second end 40. The body portion 54 of the cover securing member 50 spans the distance between the opposing side walls 66 when the cover securing member 50 is in the latched configuration 70. In the latched configuration 70, the body portion 54 is spaced from the cover surface 76 by the depth of the opposing side walls 66.

The battery fuse terminal cover 30 includes one or more snap-fit connections 78 within the cavity 80 on both the base portion 32 and movable portion 38 as shown in FIG. 6. Two snap-fit connections 78 are shown on each of the base portion 32 and movable portion 38 as a non-limiting example. Any number of snap-fit connections 78 can be provided as desired or required by those skilled in the art. The snap-fit connections 78 connect the battery fuse terminal cover 30 to the terminal connector 20 and fuse unit 16.

The battery fuse terminal cover 30 includes projections or ribs 82 that extend into the open cavity 80 and are configured to align the battery fuse terminal cover 30 onto the battery terminal 14. The ribs 82 can provide a friction fit between the battery fuse terminal cover 30 and the battery terminal 14. As shown, the ribs 82 can extend from the cover surface 76 or from one or more walls of the battery fuse terminal cover 30. The arrangement and dimensions of the ribs 82 are provided as examples and are not meant to be limiting. Other rib 82 configurations can be provided as desired or required by those skilled in the art. Snap-fit connections 78 alone and in combination with the friction fit provided by the ribs 82 are found to be inadequate as both can be overcome by normal and abnormal impact forces.

The open cavity 80 is unobstructed when the cover securing member 50 is in the open configuration 68. Prior to installing the terminal connector 20 to the battery 12, the battery fuse terminal cover 30 is aligned with the terminal connector 20 assisted by the ribs 82. The cover securing member 50 is rotated about the second hinge 52 from the open configuration 68 to the latched configuration 70 to secure the battery fuse terminal cover 30 to the terminal connector 20. In the latched configuration 70, the cover securing member 50 is positioned on one side of the terminal connector 20 while the first hinge 44 is positioned on the opposite side of the terminal connector 20. The cover securing member 50 preferably directly contacts the terminal connector 20 when the cover securing member 50 is in the latched configuration 70 to provide a robust connection of the battery fuse terminal cover 30 to the terminal connector 20.

The terminal connector 20 is then attached to the battery 12 such that the cover securing member 50 is positioned between the battery 12 and the terminal connector 20. When the terminal connector 20 is attached to the battery 12, at least a portion of the battery terminal 14 and a portion of the fuse unit 16 fits within the cavity 80 of the battery fuse terminal cover 30. The cover securing member 50 secures the battery fuse terminal cover 30 to the battery terminal 14 during normal vehicle use and unusual impact so that the terminal connector 20 and battery post 18 remain covered by the battery fuse terminal cover 30. It is contemplated that the cover securing member 50 can be moved to the released position (not shown)

by releasing the latch portion 60 from the retention member 64 to selectively remove the battery fuse terminal cover 30 from the terminal connector 20 without removing the terminal connector 20 from the battery 12. It is also contemplated, as shown in FIGS. 8-9, that the body portion 54 of the cover securing member 50 can be surrounded by the terminal connector 20 and the battery 12 to prevent unlatching and removal of the battery fuse terminal cover 30 from the terminal connector without first releasing the post engagement structure 22 from the battery post 18 and then removing the terminal connector 20 from the battery 12.

Figure 7:
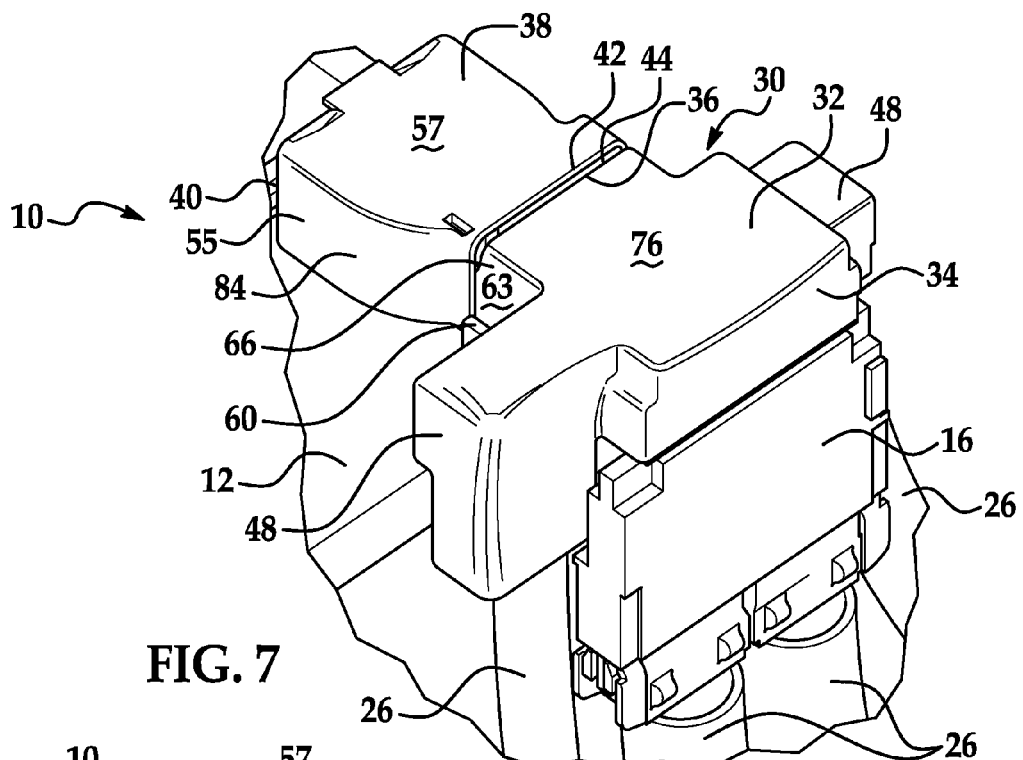
FIG. 7 is an elevated perspective view of the battery assembly with the battery fuse terminal cover installed.
Figure 8:
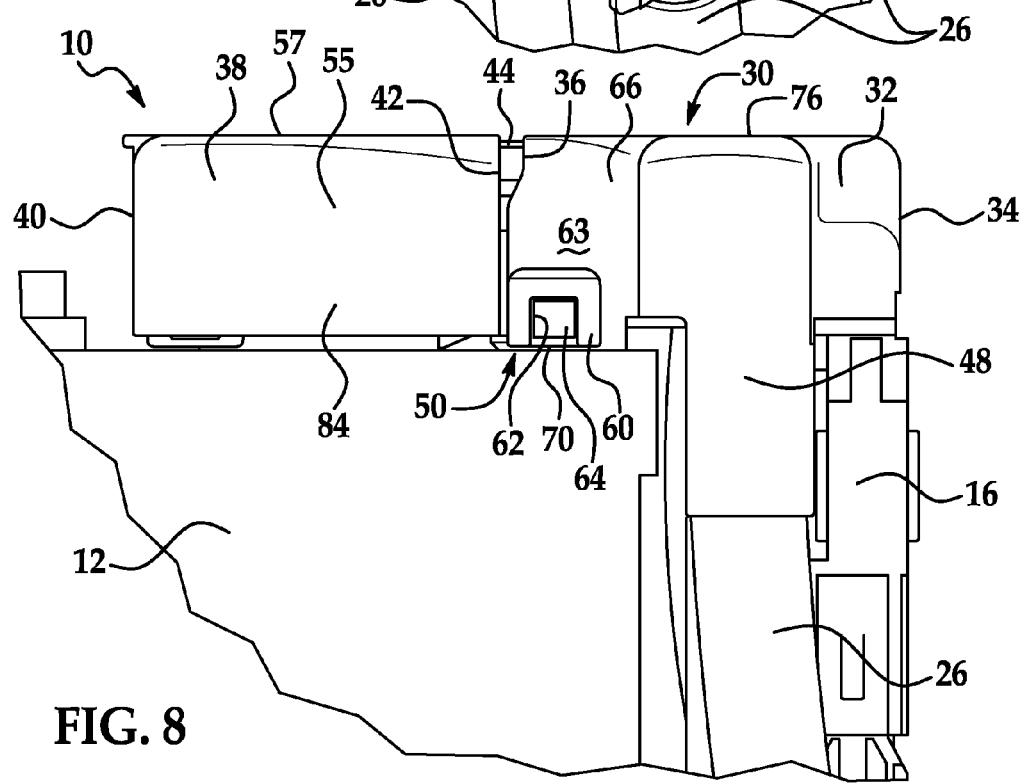
FIG. 8 is a side perspective view of the battery assembly with the battery fuse terminal cover installed and in the concealing position.
Figure 9:
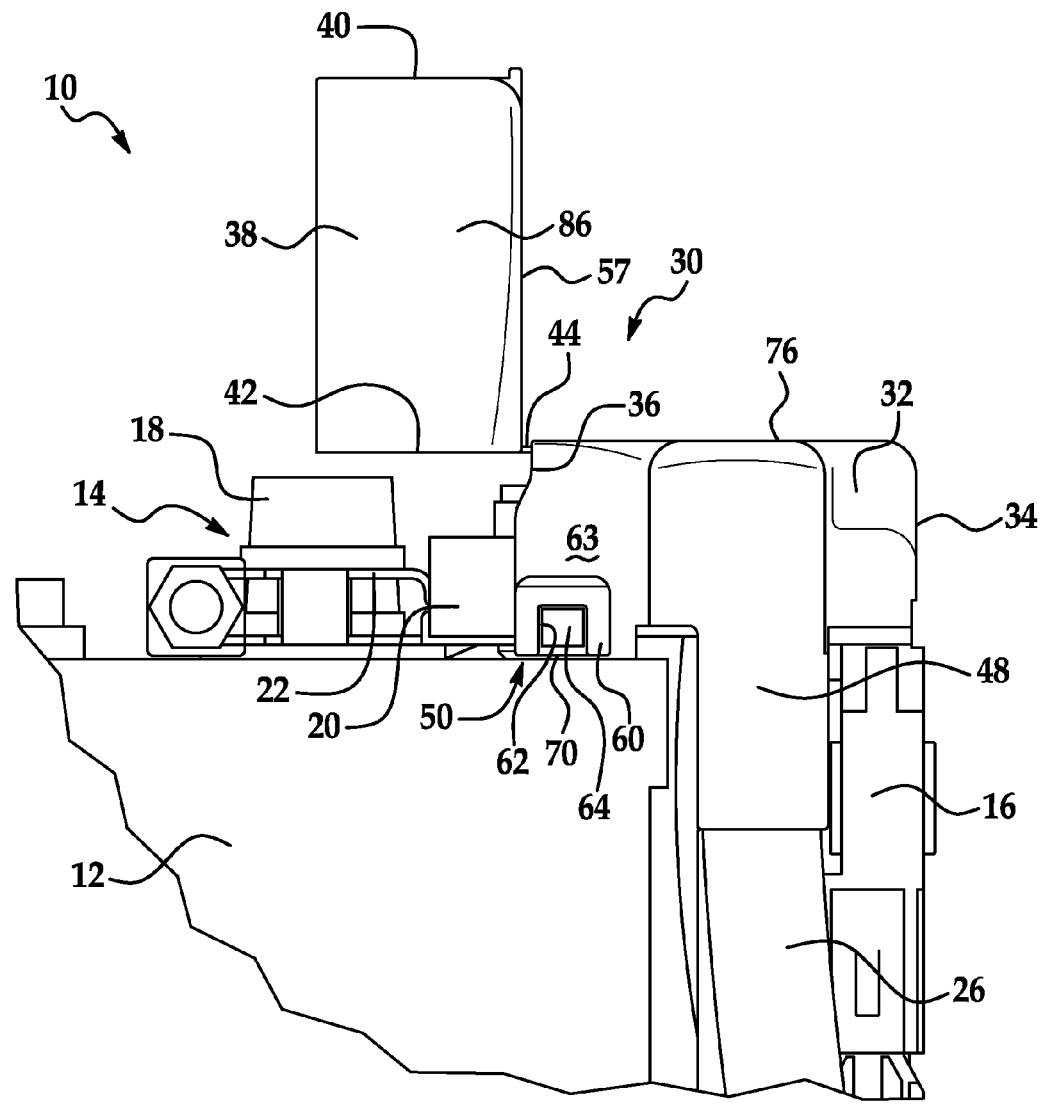
FIG. 9 is a side perspective view of the battery assembly with the battery fuse terminal cover installed and in the exposing position.

FIGS. 7-9 show the battery assembly 10 disclosed herein. The battery fuse terminal cover 30 and terminal connector 20 are attached to the battery 12. In the battery assembly 10, the cover securing member 50 is in the latched configuration 70 with the retention member 64 received in the latch opening 62 of the latch portion 60. The base portion 32 covers the studs 24 and stud connectors 28 of the fuse unit 16. The movable portion 38 is configured to rotate relative to the base portion 32 via the first hinge 44 between a concealing position 84 shown in FIGS. 7 and 8 and an exposing position 86 shown in FIG. 9. The concealing position 84 covers the battery terminal 14 and at least a portion of the fuse unit 16. The concealing position 84 prevents contact of the battery terminal 14 with surrounding parts and surrounding body sheet metal to prevent shorts and damage to the battery 12. The exposing position 86 allows access to the post 18 and at least part of the terminal connector 20. Specifically, the exposing position 86 allows access to the post engagement structure 22 to tighten or release the post engagement structure 22 from the battery post 18 for attachment or removal of the terminal connector 20 to and from the battery 12.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A cover for a battery fuse terminal comprising:
   a base portion having a first end and a first hinge end opposite the first end;
   a movable portion having a second end and a second hinge end opposite the second end;
   a first hinge connecting the first hinge end of the base portion and the second hinge end of the movable portion, wherein the movable portion is configured to rotate relative to the base portion via the first hinge between a concealing position and an exposing position;
   and a cover securing member including a body portion having a third hinge end connected to the base portion by a second hinge and a third end opposite the third hinge end, the cover securing member being movable relative to the base portion between an open configuration and a latched configuration, in which the body portion extends across a width of the base portion, wherein a width of the body portion is less than a distance between the first end and the first hinge end of the base portion.

2. The cover of claim 1, further comprising:
   a retention member on one of the base portion and the third end of the cover securing member; and
   a latch portion on the other of the base portion and the third end of the cover securing portion which engages the retention member when the cover securing member is in the latched configuration.

3. The cover of claim 1, wherein the second hinge is located on the base portion adjacent to the first hinge end and having an axis extending substantially perpendicular to an axis of the first hinge.

4. The cover of claim 1, wherein the base portion comprises a cover surface and two lateral walls extending from opposing sides of the cover surface, and wherein the body portion spans a distance between the two lateral walls when the cover securing member is in the latched configuration.

5. The cover of claim 4, wherein the body portion of the cover securing member is spaced from the cover surface by the two lateral walls when the cover securing member is in the latched configuration.

6. The cover of claim 4, wherein the cover surface and two lateral walls define an open cavity, and wherein the open cavity is unobstructed when the cover securing member is in the open configuration and is partially obstructed when the cover securing member is in the latched configuration.

7. The cover of claim 1, wherein the cover securing member is located proximate the first hinge end of the base portion.

8. The cover of claim 1, wherein the cover securing member is located with the base portion on one side of the first hinge, and the movable portion is located on an opposite side of the first hinge.

9. The cover of claim 1, further comprising:
   a cavity, with the base portion defining a first portion of the cavity and the movable portion defining a second portion of the cavity, wherein the first portion of the cavity is at least partially exposed and the second portion of the cavity is fully exposed with the cover securing member in the latched configuration.

10. A battery assembly for a battery comprising:
    a battery terminal having a post, a terminal connector and a post engagement structure coupling the post and the terminal connector;
    a fuse unit coupled to the terminal connector; and
    a battery fuse terminal cover comprising:
       a base portion covering at least a portion of the fuse unit;
       a movable portion covering at least a portion of the battery terminal;
       a first hinge connecting the base portion and movable portion, wherein the movable portion is movable about the base portion via the hinge between a concealing position in which the terminal connector is concealed and an exposing position in which the terminal connector is exposed; and
       a cover securing member extending from the base portion, wherein the cover securing member is spaced apart from the movable portion and the post and is configured to retain the battery fuse terminal cover on the battery terminal.

11. The battery assembly of claim 10, wherein the movable portion and base portion define a cavity having an opening, the cavity configured to receive at least a portion of the battery terminal and at least a portion of the fuse unit.

12. The battery assembly of claim 11, wherein the base portion defines a first portion of the cavity and the movable portion defines a second portion of the cavity, with the cover securing member spanning a width of the first portion of the cavity.

13. The battery assembly of claim 12, wherein the battery fuse terminal cover further comprises a second hinge, and the cover securing member further comprises a body portion having a first end and a second end, with the second hinge connecting the first end to the base portion, the cover securing member movable between a latched configuration in which the body portion extends across a width of the base portion and an open configuration.

14. The battery assembly of claim 13, wherein the second hinge is positioned at a location on the base portion that is proximate to the first hinge and having an axis extending substantially perpendicular to an axis of the first hinge.

15. The battery assembly of claim 10, wherein the cover securing member is located with the base portion on one side of the first hinge, and the movable portion is located on an opposite side of the first hinge.

16. The battery assembly of claim 13, wherein the base portion has a first end and a second end opposite the first end, the movable portion has a first end and a second end opposite the first end, with the first hinge coupling the second end of the base portion to the second end of the movable portion, and wherein the body portion of the cover securing member extends a width of the base portion and a width of the body portion is less than a distance between the first end and the second end of the base portion.

17. The battery assembly of claim 12, wherein the first portion of the cavity is at least partially exposed and the second portion of the cavity is fully exposed with the cover securing member in the latched configuration.

18. A cover for a battery fuse terminal comprising:
a base portion having a first end and a first hinge end opposite the first end;
a movable portion having a second end and a second hinge end opposite the second end;
a first hinge connecting the first hinge end of the base portion and the second hinge end of the movable portion, wherein the movable portion is configured to rotate relative to the base portion via the first hinge between a concealing position and an exposing position; and
a cover securing member connected to the base portion and spaced apart from the second end of the movable portion and the second hinge end of the movable portion, wherein the cover securing member is located with the base portion on one side of the first hinge, and the movable portion is located on an opposite side of the first hinge.

* * * * *